(No Model.)

D. ARNDT.
Lamp.

No. 235,926.          Patented Dec. 28, 1880.

WITNESSES

INVENTOR

ATTORNEYS

UNITED STATES PATENT OFFICE.

DANIEL ARNDT, OF CLEVELAND, OHIO, ASSIGNOR TO HIMSELF AND JOSEPH BALLHOUSE, OF SAME PLACE.

LAMP.

SPECIFICATION forming part of Letters Patent No. 235,926, dated December 28, 1880.

Application filed October 21, 1880. (No model.)

*To all whom it may concern:*

Be it known that I, DANIEL ARNDT, of Cleveland, in the county of Cuyahoga and State of Ohio, have invented certain new and useful Improvements in Lamps; and I do hereby declare the following to be a full, clear, and exact description of the invention, such as will enable others skilled in the art to which it pertains to make and use it, reference being had to the accompanying drawings, which form part of this specification.

My invention relates to lamps; and it consists in a construction hereinafter specified for keeping cool both the bowl of the lamp and its contained oil; also, for supplying oxygen to the flame to make a white and steady light.

Figure 1:
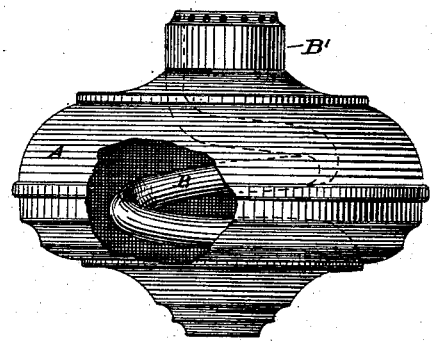
Figure 2:
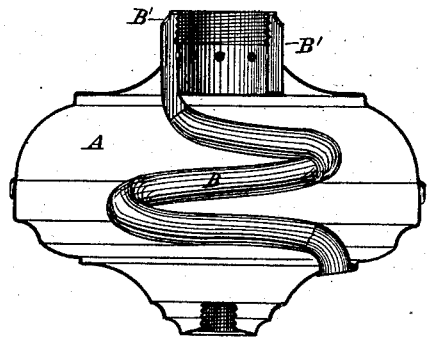

In the drawings, Figure 1 represents a lamp with a portion of its bowl removed to show the worm-shaped cooler and ventilator. Fig. 2 is a view of said lamp in transverse vertical section.

A is the bowl of a lamp, and B is the cooling or ventilating tube. It is the character and application of this tube B in a lamp that constitutes the main feature of my invention. It will be seen that this tube B is coiled, spiral, or worm-shaped, and that one end (the lower) opens to the external air, while the other end opens and terminates in the shape of an annular open or perforated collar or gallery, B', that shall permit of the escape and application of air in a sufficiently close proximity to the flame of the lamp to afford the requisite supply of oxygen.

The lower end of the tube B may, if desired, be furnished with any valve-damper or register contrivance, whereby the amount of air admitted to the tube B may be governed and controlled.

I do not limit myself to the length of the tube B, or to the number of its coils or convolutions.

The operation of a lamp made according to my invention is as follows: Air enters the lower end of the tube B, and is discharged near the flame, as described, to furnish a full supply of oxygen. The heat of the flame causes a draft or suction, whereby fresh air from without is continually drawn into the tube B, and as this tube is surrounded by the contained oil in the bowl of the lamp, both the bowl and the oil are always kept cool, and as this cool air is brought to the very locality of the flame and in the most intimate juxtaposition with all the parts that are liable to be detrimentally heated, it is evident that said parts will remain safely cool during the use of the lamp.

What I claim is—

1. In a lamp, the combination, with an annular air-discharge chamber located in close proximity to the burner, of an air-tube located within the oil-receptacle, and made of less diameter than that of the burner, and secured at its upper end to one side of the annular air-discharge chamber, and its lower end communicating with the outer air, said tube being disposed within the oil-receptacle so as to permit the wick to extend to the bottom of the oil-receptacle, substantially as set forth.

2. In a lamp, the spiral or worm-shaped air-tube B, constructed with an annular air-discharging end, B', substantially as and for the purpose shown.

In testimony whereof I have signed my name to this specification in the presence of two subscribing witnesses.

DANIEL ARNDT.

Witnesses:
 JNO. CROWELL, Jr.,
 W. E. DONNELLY.